(12) United States Patent
Yamamoto et al.

(10) Patent No.: US 8,139,194 B2
(45) Date of Patent: Mar. 20, 2012

(54) DISPLAY DEVICE HAVING PARTICULAR PIXELS AND SIGNAL WIRING INTERNAL CIRCUITS

(75) Inventors: Tsunenori Yamamoto, Hitachi (JP); Ken Ohara, Chiba (JP); Yoshiaki Nakayoshi, Oamishirasato (JP); Susumu Edo, Mobara (JP); Hiroshi Saito, Fujisawa (JP)

(73) Assignees: Hitachi Display, Ltd., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

(21) Appl. No.: 13/230,019

(22) Filed: Sep. 12, 2011

(65) Prior Publication Data

US 2012/0001835 A1 Jan. 5, 2012

Related U.S. Application Data

(62) Division of application No. 11/835,453, filed on Aug. 8, 2007, now Pat. No. 8,023,087.

(30) Foreign Application Priority Data

Aug. 23, 2006 (JP) .................................. 2006-226013
Sep. 11, 2006 (JP) .................................. 2006-244972

(51) Int. Cl.
*G02F 1/1345* (2006.01)
*G02F 1/1343* (2006.01)
*G09G 3/20* (2006.01)
*G09G 3/30* (2006.01)

(52) U.S. Cl. ........ 349/151; 349/152; 349/143; 349/149; 345/55; 345/80

(58) Field of Classification Search .................. 349/151, 349/152, 143, 149; 345/55, 80
See application file for complete search history.

(56) References Cited

U.S. PATENT DOCUMENTS

| 6,111,776 | A  | * | 8/2000 | Russell ........................ 365/124 |
| 7,587,256 | B2 | * | 9/2009 | Goldman ...................... 700/138 |
| 8,023,087 | B2 | * | 9/2011 | Yamamoto et al. ........... 349/143 |
| 2004/0160444 | A1 | * | 8/2004 | Salesin et al. ................. 345/471 |
| 2008/0018557 | A1 | * | 1/2008 | Maeda ............................ 345/55 |
| 2010/0013853 | A1 | * | 1/2010 | Takatori ....................... 345/611 |

FOREIGN PATENT DOCUMENTS

| JP | 11-190857 | 7/1999 |
| JP | 11-337966 | 12/1999 |
| JP | 2008-46598 | 2/2008 |

* cited by examiner

*Primary Examiner* — Mike Qi
(74) *Attorney, Agent, or Firm* — Antonelli, Terry, Stout & Kraus, LLP.

(57) ABSTRACT

In a display device of built-in driver circuit type including a non-rectangular image display area, the frame area surrounding the display area is reduced and the wiring delay is reduced. The image display device includes a plurality of pixels arranged in an orthogonal matrix form, a plurality of scanning wiring lines connected to the plural pixels, a plurality of signal wiring lines connected to the plural pixels, the signal wiring lines being disposed to construct an orthogonal matrix form with the plural scanning wiring lines; signal wiring internal circuits for driving the plural signal wiring lines, and an image display area including a plurality of pixels, the image display area having a non-rectangular outer contour. The signal wiring internal circuits are separated from each other in an extending direction of the signal wiring lines in a unit of length of the pixel.

20 Claims, 11 Drawing Sheets

DISPLAY DEVICE HAVING PARTICULAR PIXELS AND SIGNAL WIRING INTERNAL CIRCUITS

CROSS REFERENCE TO RELATED APPLICATION

This application is a divisional application of U.S. application Ser. No. 11/835,453, filed Aug. 8, 2007 now U.S. Pat. No. 8,023,087, the contents of which are incorporated herein by reference.

BACKGROUND OF THE INVENTION

The present invention relates to display devices such as a Liquid Crystal Display (LCD) device and an organic ElectroLuminescent (EL) display device, and in particular, to a display device including a display section or area having a non-rectangular outer contour.

Description will now be given of a conventional display device.

Heretofore, there have been primarily employed Cathode Ray Tubes (CRT) devices as display devices. Recently, liquid crystal display devices of active matrix type which are planar display devices have been increasingly used due to space and power saving effects thereof. The LCD device is a display device using light transmission of a liquid crystal. The device does not emit light by itself, but controls light, i.e., backlight from a backlighting device through its states including a transmission state, an interruption state, and an intermediate state therebetween to thereby conducting gray scale or gradation display. Additionally, organic EL display devices which are also planar display devices have been put to practical uses. Heretofore, LCD devices have found application thereof primarily in products such as screens of notebook-sized personal computers and monitors of desktop personal computers. However, the LCD devices have been recently employed as display screens of Television sets and cellular phones. In the display devices employed in these apparatuses, it is desirable that the surface on the display side of the apparatus has a large display area ratio. The image display section serves functions as the intrinsic display device. Although the section enclosing the image display area, i.e., a frame section is an area required for the display operation, but is not particularly necessary for the user and is not desirable for the good design of the display. Reducing the frame section not directly contributing to the display for the user results in the realization of an efficient display function.

For the LCD devices having been used in many apparatuses, an attempt has been made to reduce or to narrow the frame area in each apparatus. Particularly, this effort is remarkably made for the notebook-sized personal computers. Although the notebook-sized personal computers in an early stage include quite a large frame area, the area is quite small at present.

The frame section includes wiring, circuits, and semiconductor devices required for the display operation of the LCD device. For example, JP-A-11-337966 describes a technique in which by constructing an efficient wiring pattern between semiconductors, the frame area is narrowed and the production cost is lowered. Additionally, JP-A-11-190857 describes a technique in which part of the circuit to drive the LCD device is integrally constructed in the panel and Indium Tin Oxide (ITO) wiring is employed to further reduce the circuit area to narrow the frame section and to improve yielding.

Description has been given of examples of display devices using liquid crystal. Similar efforts have been exerted also for display devices using organic EL elements.

However, the ideas to narrow the frame area is applied primarily to display devices including an image display area having a rectangular outer contour. In a display device having a rectangular outer contour, it is possible to construct an outer contour of the display section according to the directions of pixels orthogonally arranged in a shape of an orthogonal matrix.

On the other hand, recently, display devices having a non-rectangular outer contour have also been discussed. For example, the dashboard of a car has desirably a non-rectangular shape, and there may desirably exist an elliptic cellular and a heart-shaped cellular. In such cases in which the device has a non-rectangular outer contour, the outer contour of the display section is configured such that outer edges thereof are in directions different from those associated with the angles of the directions to arrange the pixels in the orthogonal matrix. This likely results in collision between wiring leader lines from the pixel display section and an internal driver circuit section. It is hence required that the circuit section is arranged on an outside location, and the frame area increases as a result.

In addition, the leader line is arranged to widely detour the internal driver circuit section and passes the outer side of the circuit section. This further increases the frame area and the wiring distance, leading to occurrence of a wiring delay. Additionally, by arranging the wiring to connect internal driver circuit sections on an outer side of the circuit section, it possibly occurs that the frame area further increases. Resultantly, the margin is too small to arrange the wiring, and hence the designing of the device is difficult depending on cases.

When the image display device having the non-rectangular display section as above includes a signal wiring internal circuit and a scanning wiring internal circuit, there appear an area of each internal circuit and a wiring area thereof as well as an overlapped area between the signal wiring internal circuit and the scanning wiring internal circuit. This leads to a problem of increase in the frame area. According to JP-A-11-337966 and JP-A-11-190857, the arrangement of the internal circuits in the display devices having a non-rectangular outer contour has not been discussed.

SUMMARY OF THE INVENTION

An object of the present invention is to remove the problems and the difficulties. It is therefore the object of the present invention to provide a display device of internal driver circuit type having a non-rectangular image display area in which the frame area on the outer side of the display area and the wiring delay are reduced. Another object of the present invention is to provide a display device in which the designing thereof is easy.

To achieve the objects according to the present invention, there is provided an image display device including a plurality of pixels arranged in an orthogonal matrix form, a plurality of scanning wiring lines connected to the plural pixels; a plurality of signal wiring lines connected to the plural pixels, the signal wiring lines being disposed to construct an orthogonal matrix form with the plural scanning wiring lines; signal wiring internal circuits for driving the plural signal wiring lines, and an image display area including a plurality of pixels, the image display area having a non-rectangular outer contour. The signal wiring internal circuits are separated from each other in an extending direction of the signal wiring lines in a unit of length of the pixel.

In this connection, that the outer contour of the image display area is a non-rectangular contour indicates that the contour is not a rectangle with four 90° corners as in the conventional image display device, but the contour includes a rhombus, a contour with curved edges, a circular contour, and an elliptic contour.

According to another configuration of the present invention, there is provided an image display device including a plurality of pixels arranged in an orthogonal matrix form, a plurality of scanning wiring lines connected to the plural pixels; a plurality of signal wiring lines connected to the plural pixels, the signal wiring lines being disposed to construct an orthogonal matrix form with the plural scanning wiring lines; and signal wiring internal circuits for driving the plural signal wiring lines. The plural pixels occupy an area in which the number of columns of the orthogonal matrix of pixels varies for each row thereof and an area in which the number of rows of the orthogonal matrix of pixels varies for each column thereof. The signal wiring internal circuits are separated from each other in an extending direction of the signal wiring lines in a unit of length of the pixel.

In the configuration, the plural pixels are arranged in areas such that the number of columns pixels varies between respective rows of pixels constituting the orthogonal matrix. This is because the pixel areas are also non-rectangular in association with the image display area having a non-rectangular outer contour. Additionally, the pixel areas are disposed such that the number of rows of pixels also varies between respective columns constituting the orthogonal matrix for the similar reason.

Moreover, according to further another configuration of the present invention, there is provided an image display device including a plurality of pixels arranged in an orthogonal matrix form, a plurality of scanning wiring lines connected to the plural pixels; a plurality of signal wiring lines connected to the plural pixels, the signal wiring lines being disposed to construct an orthogonal matrix form with the plural scanning wiring lines; scanning wiring internal circuits for driving the plural scanning wiring lines, and an image display area including a plurality of pixels, the image display area having a non-rectangular outer contour. The scanning wiring internal circuits are separated from each other in an extending direction of the scanning wiring lines in a unit of length of the pixel.

In the configuration, the image display device is constructed using the scanning wiring internal circuits; and the scanning wiring internal circuit, not the signal wiring internal circuit, is separated. The image display device may also be constructed such that both of the signal wiring internal circuit and the scanning wiring internal circuit are separated in the unit of the length of the pixel.

In each of the configurations, a more advantage is expectable by use of a configuration in which the leader line for the scanning wiring is arranged between the signal wiring internal circuits separated in the pixel length unit, a configuration in which the signal wiring internal circuits are formed in modules in the pixel length unit in the extending direction of the signal wiring, a configuration in which the signal wiring internal circuit constructed in the module includes a circuit section, an input/output wiring section for the circuit section, a wiring section to detour the input/output wiring section, and a reserved area to arrange wiring other than the detour wiring; a configuration in which a plurality of signal wiring internal circuits in the module construction are combined with each other in use in the extending direction of the signal wiring, a configuration in which the number of combinations in the extending direction of the signal wiring is variable in association with the number of pixels connected to the signal wiring, a configuration in which a plurality of signal wiring internal circuits in the module construction are combined with each other in use in the extending direction of the scanning wiring, a configuration in which the number of combinations in the extending direction of the scanning wiring is equal to the maximum number of pixels of the scanning wiring in the extending direction of the scanning wiring, and/or a configuration in which signal wiring internal circuits are arranged along an outer contour of the image display area.

To solve the problem, there is provided according to the present invention an image display device including a plurality of pixels arranged in an orthogonal matrix form, a plurality of scanning wiring lines connected to the plural pixels; a plurality of signal wiring lines connected to the plural pixels, the signal wiring lines being disposed to construct an orthogonal matrix form with the plural scanning wiring lines; a pixel display area including a plurality of pixels, the pixel display area having a non-rectangular outer contour; scanning wiring internal circuits formed along the outer contour of the pixel display area for driving the plural scanning wiring lines; and signal wiring internal circuits formed along the outer contour of the pixel display area for driving the plural signal wiring lines. The signal wiring internal circuits and the scanning wiring internal circuits are arranged beginning at a start point, the start point being either one of two contact points, selected from contact points between the outer contour of the pixel display area and a particular rectangle circumscribing the outer contour, the contact points being on mutually different edges of the particular rectangle, the two contact points having a shortest distance therebetween along the outer contour among any other combinations of two contact points.

According to the present invention, since it is possible to reduce the frame area in the display device having a non-rectangular outer contour, there can be provided a display device for good design and with high functional efficiency.

DESCRIPTION OF THE EMBODIMENTS

Description will now be given of an embodiment according to the present invention.

First Embodiment

Figure 1:
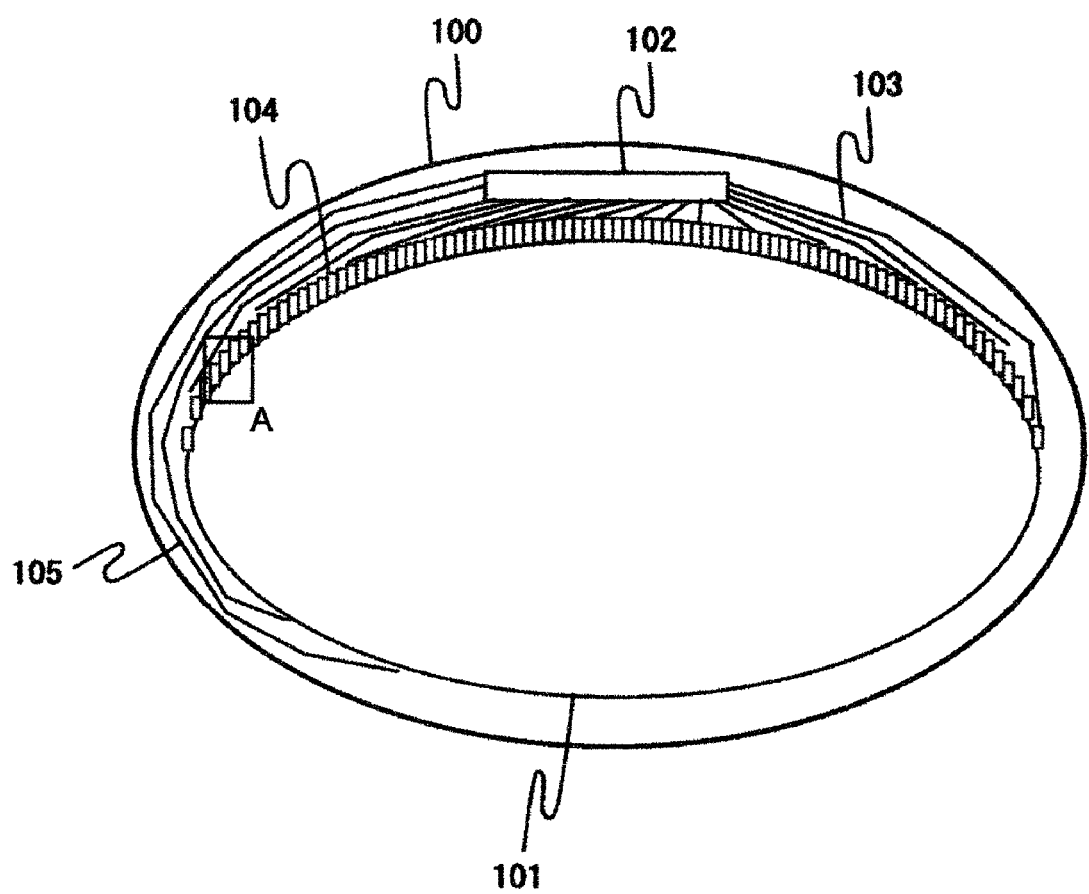
FIG. 1 is a diagram showing an outer contour of a first embodiment of a display device.

FIG. 1 shows an outline of a display device including a display section having a non-rectangular outer contour. Although the display section has an elliptic shape in FIG. 1, this is only an example of the display section having a non-rectangular outer contour.

In the display device 100 of FIG. 1 including a pixel display area 101, the area 101 has an elliptic outer contour and glass of the display device 100 has also an elliptic outer contour. The display device 100 in the first embodiment is an LCD device. Although not shown in FIG. 1, in the pixel display area 101, pixels are disposed in the form of an orthogonal matrix and signal wiring and scanning wiring are arranges also in the orthogonal configuration as in an ordinary LCD device. The signal wiring line is driven by a driver 102 via a signal wiring internal circuit 104 and a signal wiring leader line 103. The scanning wiring line is directly driven by the driver 102 via a scanning wiring leader line 105.

The display device 100 shown in FIG. 1, unlike the conventional LCD device, includes the pixel display area 101 having an elliptic outer contour, and hence the signal wiring internal circuit 104 and the like are also arranged adjacent to the pixel display area 101 in a curved form. Problems of the arrangement will be now described in detail.

Figure 2:
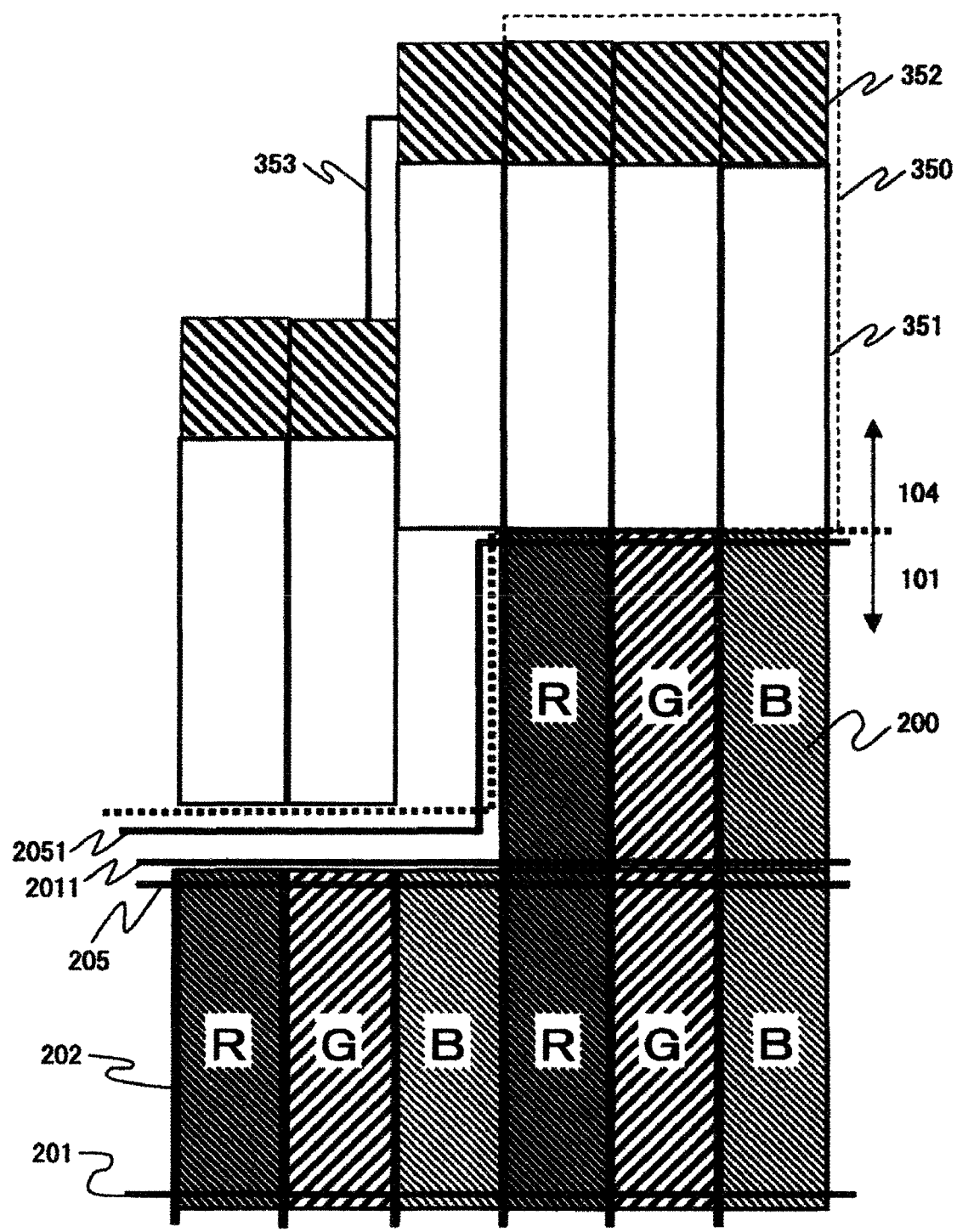
FIG. 2 is a magnified view (two pixels) of a curved section in the periphery of an image display area when the conventional internal circuit is employed.
Figure 3:
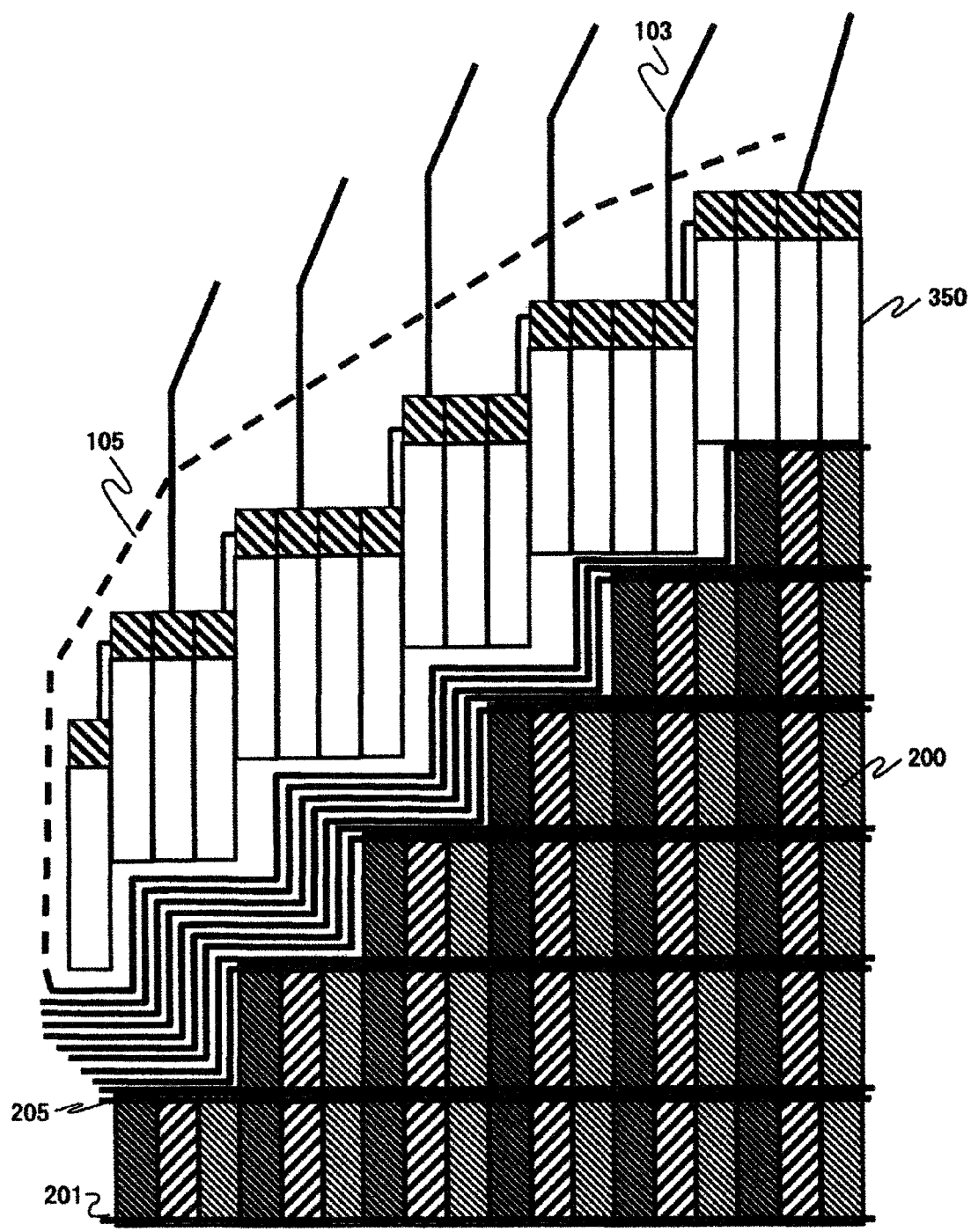
FIG. 3 is a magnified view (six pixels) of a curved section in the periphery of an image display area when the conventional internal circuit is employed.

FIGS. 2 and 3 show configurations obtained by applying the conventional signal wiring internal circuit to the contour of the display device shown in FIG. 1. FIGS. 2 and 3 show magnified views of a curved arrangement section A of the pixel display area 101 and the signal wiring internal circuit 104.

In FIG. 2, an upper section over a central broken line is the signal wiring internal circuit 104 and a lower section therebelow is the pixel display area 101. The internal circuit 104 includes a conventional signal wiring internal circuit 350, and the pixel display area 101 includes a plurality of pixels 200 orthogonally arranged. In the configuration, an outer edge of the pixel display area 101 is inclined with respect to the orthogonal arrangement of the pixels, and hence the pixel array is reduced by one row beginning at an intermediate point. The pixel 200 includes, as in an ordinary LCD device, three subpixels, i.e., red (R), green (G), and blue (B) subpixels. Each subpixel is connected to scanning wiring 201, signal wiring 202, and common wiring 205.

The conventional signal wiring internal circuit 350 includes a circuit area 351 and wiring 352 to connect to input/output wiring. The wiring 352 is configured to automatically connect, when the conventional signal wiring internal circuits 350 are disposed side by side and adjacent to each other, to the wiring 352 of the adjacent internal circuit 350. Although not shown, the driver sends information via a leader line to the wiring 352.

When the number of pixel rows is reduced by one row of pixels 200 and hence the internal circuit 350 moves downward in FIG. 2, the connection of the wiring 352 is interrupted. It is hence required to additionally dispose wiring 353 to connect to the wiring 352. The wiring 353 is required at all positions when the number of the rows of pixels 200 is reduced. As FIG. 2 shows, there is required a space to dispose the scanning wiring 2011 and the common wiring 2051 connected to the pixels 200 of the removed row. Therefore, also when one row of pixels 200 is removed, the internal circuit 350 cannot be disposed adjacent to the pixels 200.

FIG. 2 shows a periphery of the pixel display area when one row of pixels 200 is removed. On the other hand, in the display device having a non-rectangular outer contour, it is also likely that the number of rows of pixels 200 is continuously reduced as in the curved arrangement section A of the elliptic pixel display area A shown in FIG. 1. FIG. 3 shows the periphery of the pixel display area 101 in this situation.

In FIG. 3, the conventional signal wiring internal circuit 350 is connected to the signal wiring leader line 103. In FIG. 3, a broken line represents the scanning wiring leader line. The scanning wiring 201 and the common wiring 205 connected to the pixels of the removed row pass, since there is no gap to the outside of the internal circuit 350, a space between the pixels and the internal circuit 350 while the number of wiring lines is increasing. It is inevitable to dispose the internal circuit 350 on the outer side in association with the width occupied by the wiring.

Although the signal wiring 202 is not shown in FIG. 3, it can be considered, in consideration of an area to dispose the signal wiring 202 between the pixels 200 and the internal circuit 350, that the distance between the pixels 200 and the internal circuit 350 is further increased.

The scanning wiring 201 and the common wiring 205 first leave the internal circuit 350 into the outside thereof after passing through the space between the pixels 200 and the internal circuit 350 up to an edge section of the pixel display area 101 to be the scanning wiring leader lines 105 connecting to the driver 102. The width corresponding to the numbers respectively of the scanning wiring lines 201 and the common wiring lines 205 is required on the outer side of the internal circuit 350. Therefore, the frame area is remarkably increased. Since these wiring lines are resultantly arranged to widely detour the internal circuit 350, there occurs the signal delay due to the wiring delay.

Figure 4:
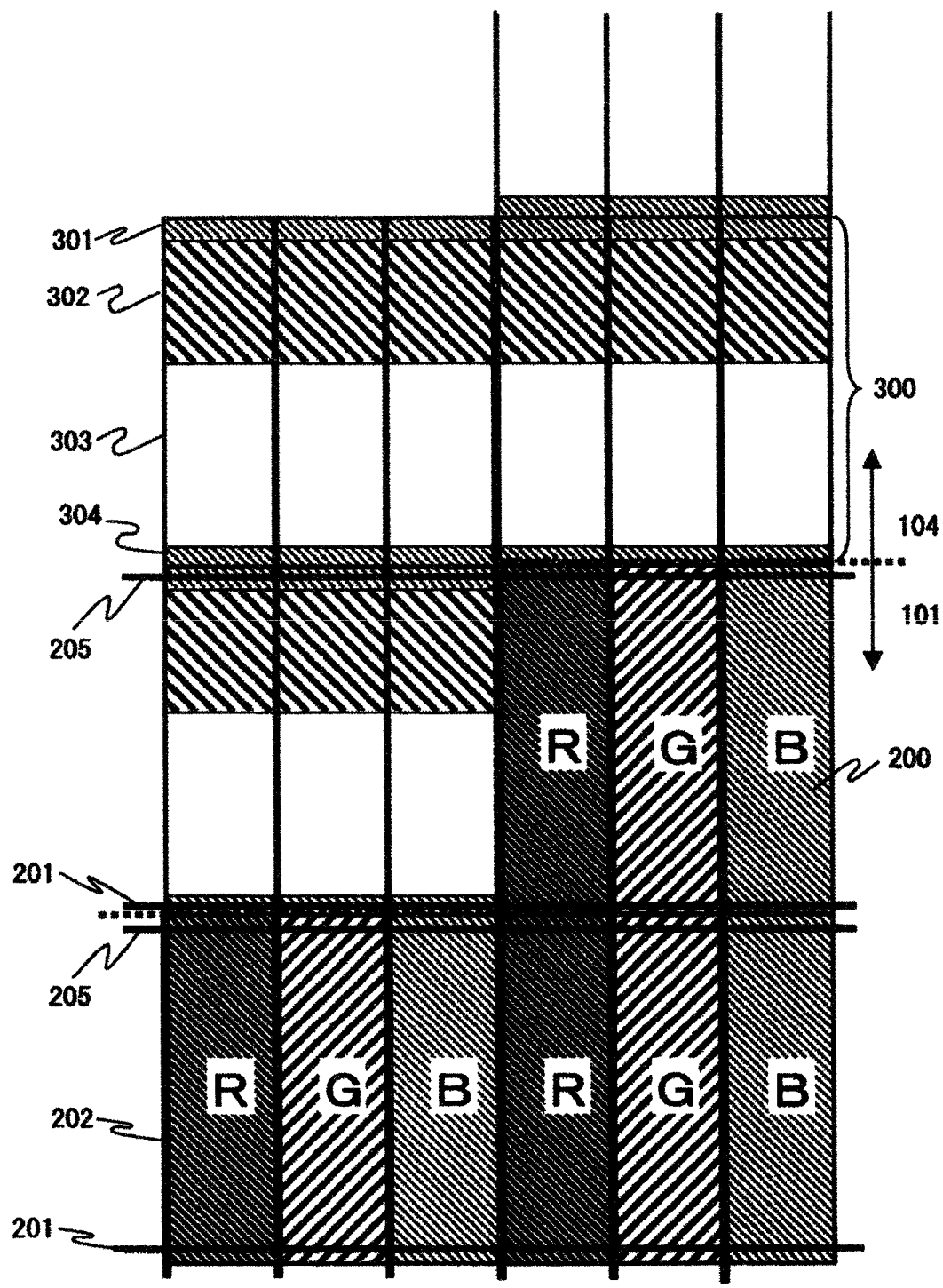
FIG. 4 is a magnified view (two pixels) of a curved section in the periphery of an image display area in the first embodiment.
Figure 5:
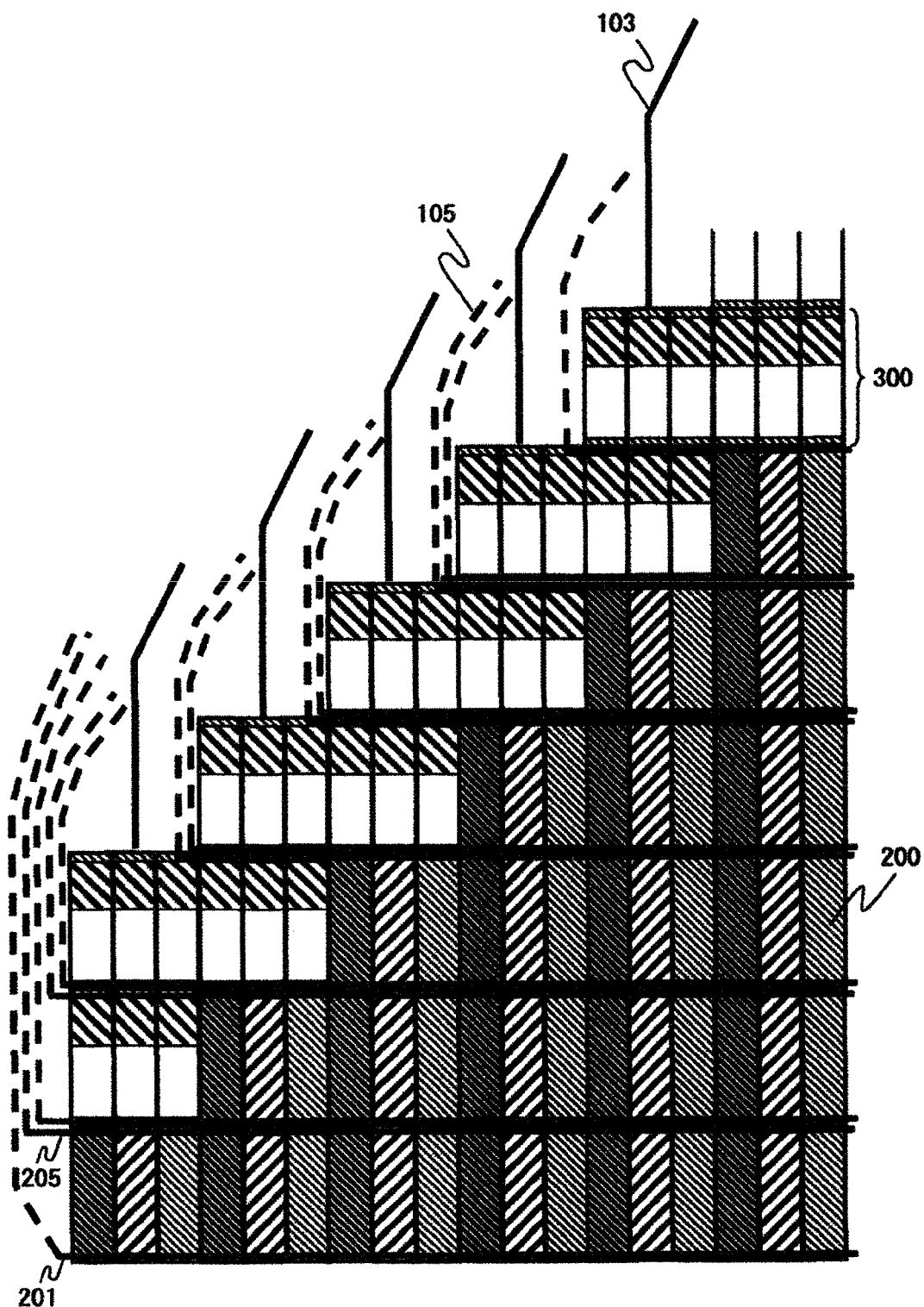
FIG. 5 is a magnified view (six pixels) of a curved section in the periphery of an image display area in the first embodiment.
Figure 6:
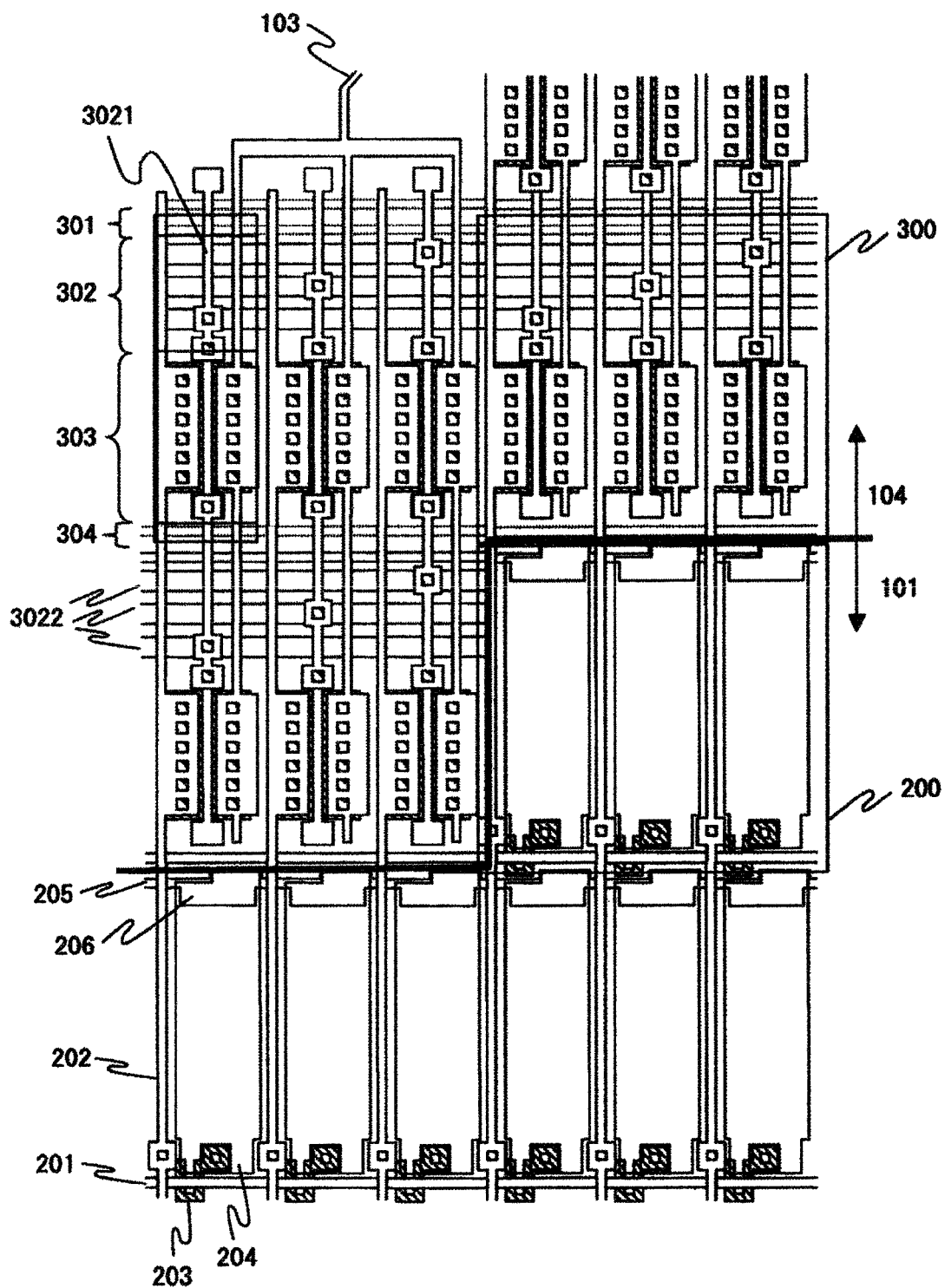
FIG. 6 is a magnified view of a curved section in the periphery of an image display area in the first embodiment.

When the signal wiring internal circuit of the prior art is applied to the elliptic pixel display area described in conjunction with FIG. 1, there appear disadvantages such as the expansion of the frame area. FIGS. 4 to 6 shows configurations to solve the problem.

FIG. 4, like FIG. 2, is a magnified view of the curved arrangement section A of the pixel display area 101 and the signal wiring internal circuit 104 shown in FIG. 1. FIG. 3 is similar to FIG. 2 in that the upper section over the central broken line is the signal wiring internal circuit 104 and the lower section is the pixel display area 101. The area 101 includes red (R), green (G), and blue (B) subpixels orthogonally arranged. Each subpixel is connected to the scanning wiring 201, the signal wiring 202, and the common wiring 205. On the other hand, FIG. 3 differs from FIG. 2 in that a signal wiring internal circuit module 300 is employed as the internal circuit for signal wiring. As FIG. 4 shows, the module 300 includes module units configured in the unit of length of the pixel 200 in the extending direction (the longitudinal direction of FIG. 4). That is, the signal wiring internal circuits are separated in the units of length of the pixel 200 in the longitudinal direction, and a wiring area 302 and a circuit area are repeatedly arranged in the unit of length of the pixel 200.

The wiring area 302 is an area for input/output wiring to the circuit area and a wiring area to detour the input/output wiring.

By disposing a predetermined gap over and below the wiring areas 302 and the circuit areas 303, it is possible to pass one of or both of the scanning wiring 201 and the common wiring 205 through the space between the separated circuit areas 303. In FIG. 4, the gaps over and below the wiring areas 302 and the circuit areas 303 are shown as a first additional wiring reserved area 301 and second additional wiring reserved area 304.

FIG. 5 shows a configuration in which the conventional signal wiring internal circuit 350 of FIG. 3 is replaced by a signal wiring internal circuit module 300. Since the module 300 is constructed as modules in the unit of length of the pixel 200 in the longitudinal direction of FIG. 5 and the gap is disposed for each separated internal circuit, the scanning wiring 201 and the common wiring 205 can pass the space between the internal circuits. It is hence possible to reduce the area which the scanning wiring 201 and the common wiring 205 are required to detour and to thereby prevent the wiring delay. Also, the area required as the scanning wiring leader line 105 can be reduced. Therefore, although the signal wiring internal circuit has a larger area than the conventional signal wiring internal circuit, the frame area can be reduced in practice when compared with the configuration employing the conventional signal wiring internal circuit. If it is assumed that the signal wiring internal circuit and the conventional signal wiring internal circuit are substantially equal in the wiring drive capacity (i.e., in the circuit area) to each other, the arrangement area of the conventional signal wiring internal circuit 350 is less than that of a plurality of signal wiring internal circuits 300 in the embodiment.

FIG. 6 shows in more detail the signal wiring internal circuit 104 and the pixel display area 101 according to the embodiment.

Since an outer edge of the pixel display area 101 is inclined with respect to the orthogonal arrangement of pixels 200, the pixel array is reduced by one row at an intermediate point. The pixel 200 of the embodiment includes three subpixels, i.e., the red, green, and blue subpixels as in an ordinary LCD device. Each subpixel includes scanning wiring 201, signal wiring 202, a transistor 203, a pixel electrode 204, common wiring 205, and a charge holding capacitor 206.

The signal wiring internal circuit 104 of the embodiment includes a function to distribute signals sent from the driver 102 to the signal wiring 202 connected to the red, green, and blue subpixels as in an ordinary LCD device. However, the circuit 104 has an aspect in which the signal wiring internal circuit 104 is constructed as modules in the unit of length of the pixel 200 in the extending direction of the signal wiring 202 (the longitudinal direction of FIG. 6).

In FIG. 6, there is formed a combination of two signal wiring internal circuit modules 300 in the extending direction of the signal wiring 202. According to an aspect of the configuration, each module 300 includes a first additional wiring reserved area 301, a circuit area 303, an area 302 including input/output wiring to the circuit area 303 and a wiring area to detour the input/output wiring, and a second additional wiring reserved area 304.

The first additional wiring reserved area 301 is a beforehand reserved area so that the common wiring 205 passes therethrough when the internal circuit modules 300 are arranged on the side of and adjacent to pixels 200.

In the area 302 including input/output wiring to the circuit area 303 and a wiring area to detour the input/output wiring, there are disposed signal input/output wiring 3022 to drive the circuit area 303 and detour wiring 3021 to detour the wiring 3022. When the modules 300 are arranged in a side-by-side way, the signal input/output wiring 3022 are automatically connected to each other to transfer signals. The detour wiring 3021 is configured to transfer part of the signals from the input/output wiring 3022 to the circuit area 303 and to establish connection in a longitudinal or vertical direction. When the internal circuit modules 300 are arranged in the longitudinal direction, connection is automatically established by use of the detour wiring 3021 between the modules 300.

The circuit area 303 serves a switching function to transmit or to interrupt a signal from the signal wiring leader line 103 to each signal wiring 202. Which one of the subpixels is the signal destination is determined by signals from the signal input/output wiring 3022 and the detour wiring 3012.

The second additional wiring reserved area 304 is a beforehand reserved area so that the scanning wiring 201 passes therethrough when the internal circuit modules 300 are arranged on the side of and adjacent to pixels 200.

Thanks to the configuration described above, the signal wiring internal circuit modules 300 of the embodiment can be arranged on the horizontal and vertical sides of pixels 200 and adjacent thereto without any gap therebetween. Moreover, only by arranging the modules 300, the wiring sections therebetween are automatically connected to each other.

Although two signal wiring internal modules are connected to each other in the extending direction of the signal wiring 202 in the embodiment, if the pixel display area is large and a large number of pixels 200 are connected to the signal wiring 202, the wiring drive capacity is obtained in association with the wiring load by connecting three or more signal wiring internal modules. Also in this situation, only by arranging the modules 300, the wiring sections therebetween are readily connected to each other.

When the internal circuit of the prior art is employed in the display device having a non-rectangular outer contour as above, the wiring leader line from the pixel display area cannot pass the internal drive circuit section. It is hence required to additionally dispose the circuit section at an outside position, and hence the frame area increases.

Moreover, since the wiring section drawn as above is arranged to widely detour the internal drive circuit section to pass the outside of the circuit section, the frame area becomes larger. Also, the wiring distance is elongated, and hence the wiring delay takes place. In addition, when the wiring for the connection between the internal drive circuit sections is arranged outside the circuit section, it is likely that the frame area further increases in some cases. Consequently, the margin is too small to dispose the wiring, and the designing of the device becomes difficult depending on cases.

When compared with the configuration, the configuration of the embodiment includes, as the signal wiring internal circuit, the signal wiring internal circuit modules disposed in the unit of length of the pixel in the signal wiring extending direction. Each module includes a circuit area, an input/output wiring section to the circuit area, a wiring section to detour the input/output wiring section, and a reserved area to dispose additional wiring. In addition, a plurality of the modules are employed in combination with each other in the signal wiring extending direction. Therefore, the modules can be arranged adjacent to the pixel display area, and each wiring can be connected to the driver via a shorter route.

It is therefore possible to provide an easily designable display device with a reduced frame area and a reduced wiring delay.

Second Embodiment

The second embodiment is substantially equal to the first embodiment excepting that the second invention is applied not only to the configuration of the signal wiring internal circuit, but also to that of the scanning wiring internal configuration.

Figure 7:
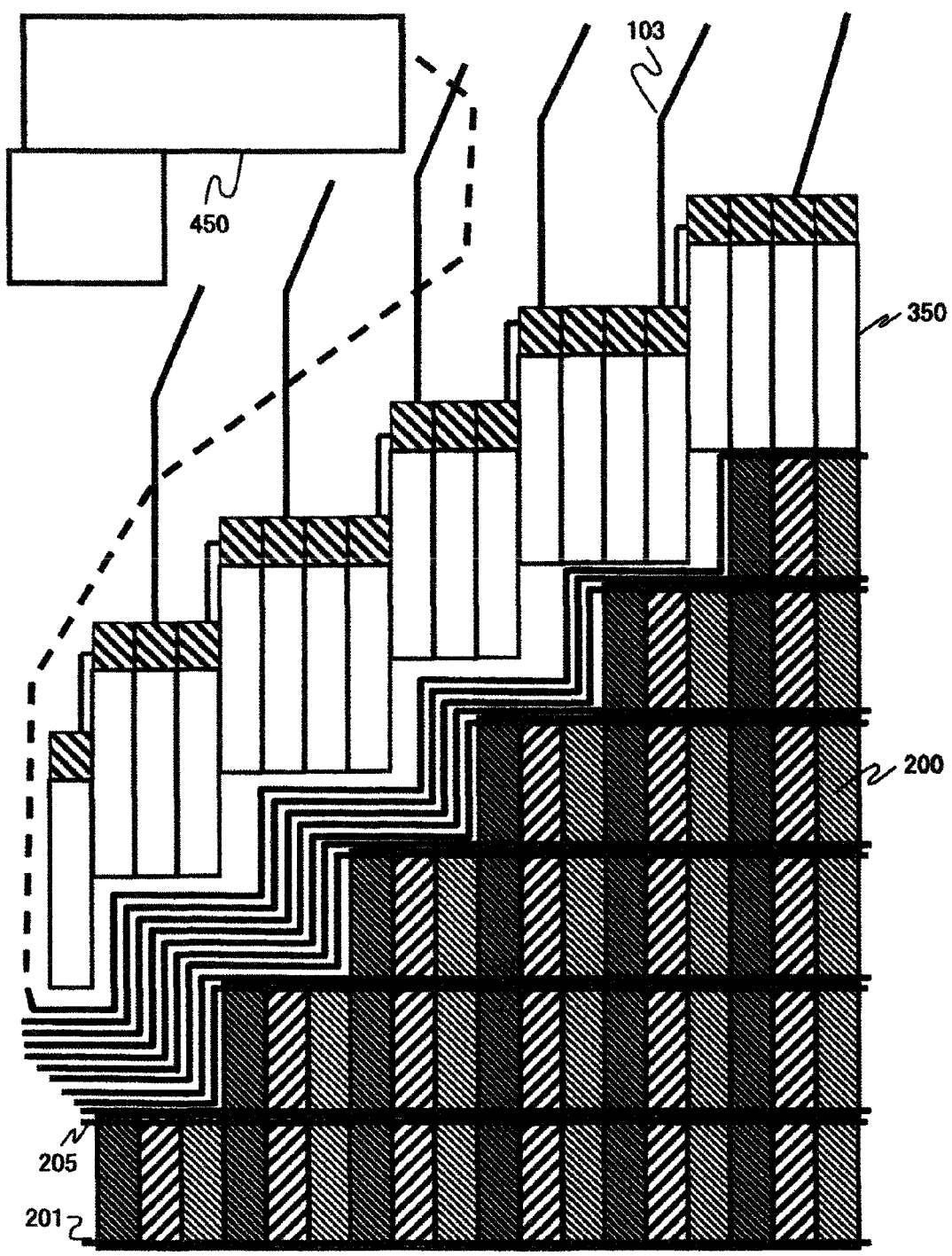
FIG. 7 is a magnified view (six pixels) of a curved section in the periphery of an image display area when the conventional internal circuit is employed in the display device according to a second embodiment.

FIG. 7 shows a magnified view of the curved arrangement section A of FIG. 1. This configuration employs the conventional signal wiring internal circuit 350 and a conventional scanning wiring internal circuit 450. Although the internal circuit 450 is smaller in the circuit area than the scanning wiring internal circuit module of the second embodiment, it is not possible to dispose the internal circuit 450 adjacent to the pixels, and the wiring is redundant. It is required to additionally arrange wiring to establish connection between the internal circuits 450. As a result, the frame area increases.

Figure 8:
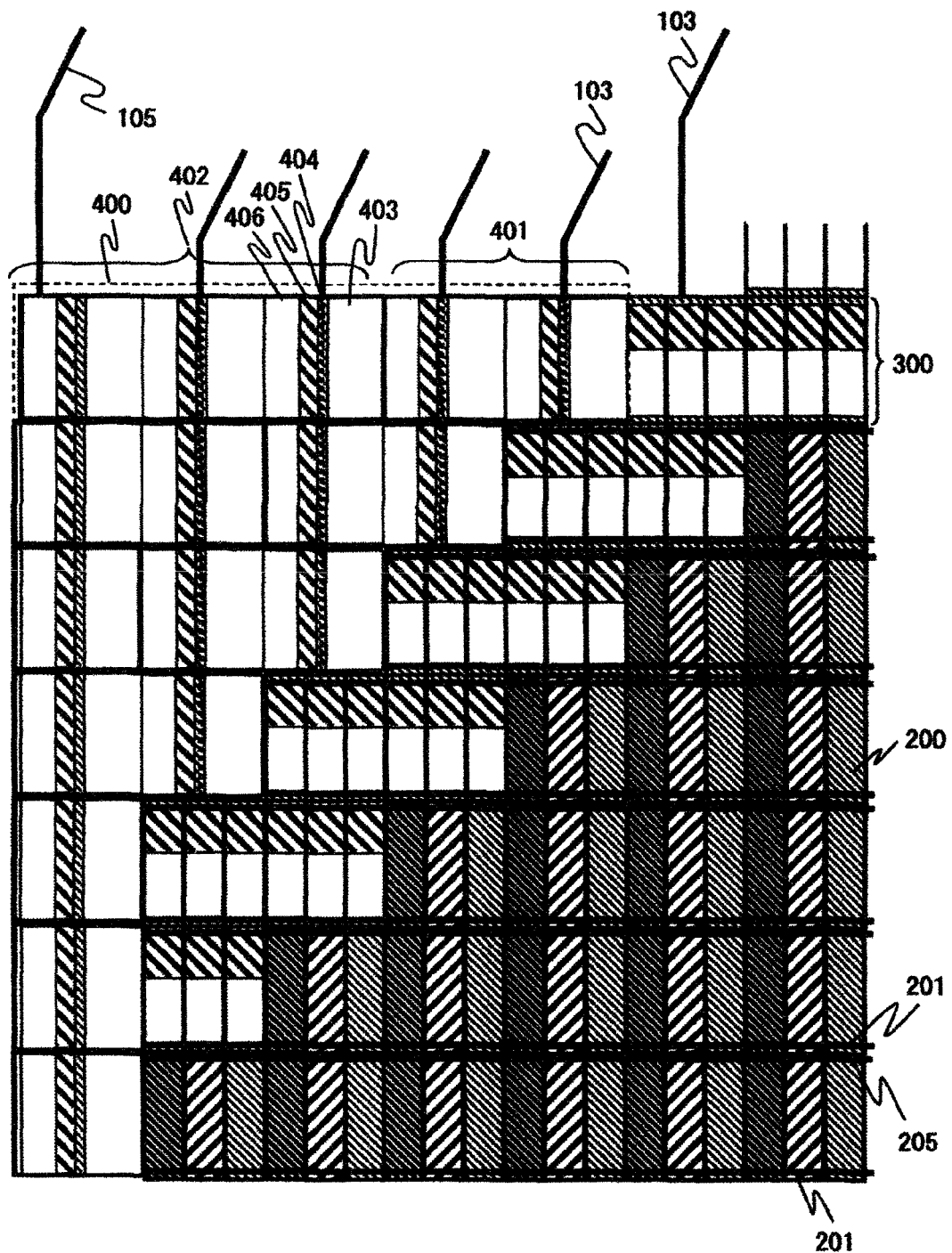
FIG. 8 is a magnified view (six pixels) of a curved section in the periphery of an image display area in the second embodiment.

When compared with the elliptic pixel display area shown in FIG. 1, the configuration employing the scanning wiring internal circuit of the prior art is attended with disadvantages, for example, the increase in the frame area. FIG. 8 shows a configuration to solve the problem.

FIG. 8 shows a magnified view of the curved arrangement section A of FIG. 1. As an internal circuit to display an image, the scanning wiring drive circuit to drive the scanning wiring is also installed in the vicinity of the pixel display area.

A scanning wiring internal circuit module block 400 is divided into modules for respective functions in the unit of length of the pixel in the scanning wiring extending direction (the horizontal direction in FIG. 8). FIG. 8 shows a signal output module 401 (for the unit of two pixels) to the scanning wiring 201 and a shift register module (for the unit of three pixels).

Each module includes an additional line reserved area 404 to arrange a first circuit area 403 and additional wiring, an area 405 for input/output wiring to the circuit area and a wiring area to detour the input/output wiring, and a second circuit area 405.

Like the signal wiring internal circuit modules 300, even when the pixel unit modules are arranged in the vertical and horizontal directions, the modules are automatically connected to each other by the input/output wiring and/or the wiring detouring the input/output wiring. However, unlike the modules 300, the scanning wiring internal circuit module block 400 is functionally divided into two modules requiring mutually different input/output wiring sections. Therefore, the modules are arranged such that the mutually different functional modules vertically adjacent to each other are not connected to each other by the input/output wiring.

Due to the configuration, the signal wiring leader line 103 from the signal wiring internal circuit module 300 can pass the additional wiring reserved area in the scanning wiring internal circuit module block 400. It is hence possible to arrange the module 400 adjacent to the module 300 on the outside of the module 300. Therefore, even if the scanning wiring drive circuit is integrally arranged, the frame area can be further reduced.

FIG. 8 shows an outline of the periphery of the pixel display area of the curved arrangement section A when the conventional signal wiring internal circuit 350 and the conventional scanning wiring internal circuit 450 are employed. Although the internal circuit 450 is smaller in the circuit area than the scanning wiring internal circuit module 400 of the embodiment, it is not possible to dispose the internal circuit 450 adjacent to the pixels, and the wiring is redundant. It is required to additionally arrange wiring to establish connection between the internal circuits 450. Therefore, by using the scanning wiring internal circuit module of the embodiment, the frame area can be more reduced when compared with the configuration employing the module 4.

In the embodiment, two signal output modules 401 are combined with each other in the scanning wiring extending direction. However, by changing the number of the modules 401 in the combination, the driving capacity may also be changed according to the number of pixels connected to the scanning wiring as in the case of the signal wiring internal circuit module.

According to the embodiment described above, also when the scanning wiring drive circuit is integrally arranged, the scanning wiring drive circuit modules are disposed for the respective functions in the unit of length of the pixel. Each module includes a circuit area, an additional wiring reserved area 404, and an area 405 for input/output wiring and wiring to detour the input/output wiring. It is therefore possible to dispose the module adjacent to the pixel display area, which makes it possible to reduce the wiring delay. It is hence possible to provide an easily designable display device with a reduced frame area and a reduced wiring delay.

Third Embodiment

Figure 9:
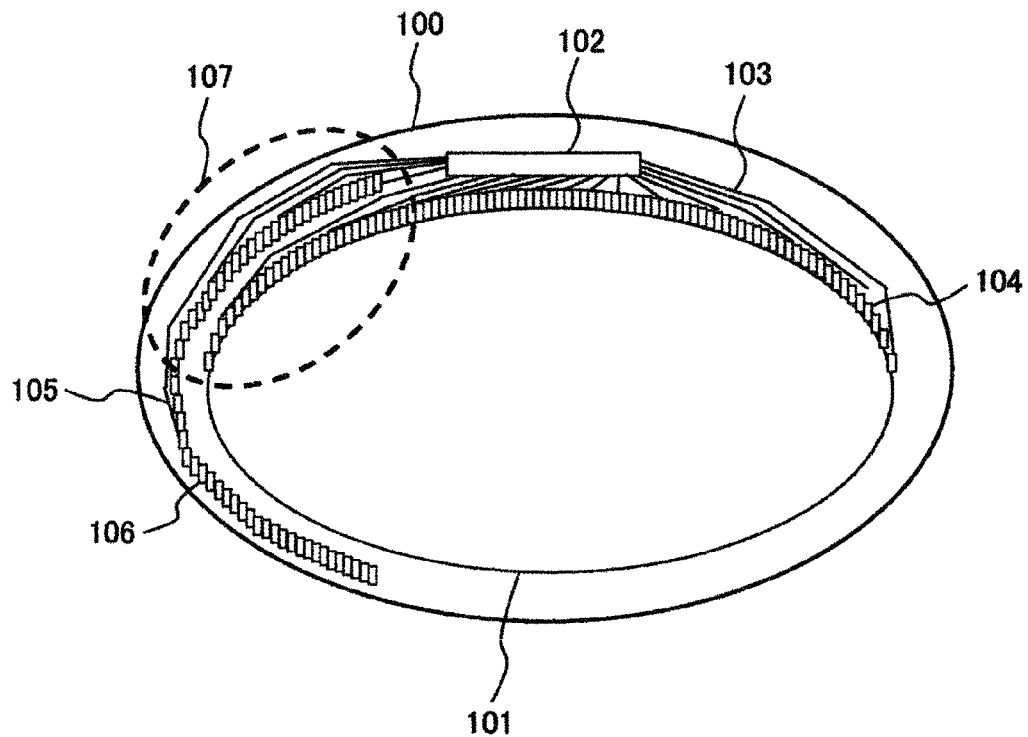
FIG. 9 is a diagram showing an outer contour of a display device having a non-rectangular image display area.

FIG. 9 is a schematic diagram showing a display device including a display section having a non-rectangular outer contour. Although the display section has an elliptic shape, this is only an example of a display section having a non-rectangular outer contour.

In the display device 100 of FIG. 9, the image display area, i.e., a pixel display area 101 has an elliptic outer contour, and glass employed in the display device 100 has also an elliptic outer contour. The display device 100 in the embodiment is an LCD device. Although not shown in FIG. 9, the pixels are arranged in the form of an orthogonal matrix in the pixel display area 101. Also, signal wiring and scanning wiring are orthogonally arranged as in an ordinary LCD device.

The signal wiring is driven by the driver 102 via the signal wiring internal circuit 104 and the signal wiring leader line 103. The scanning wiring is driven by the driver 102 via the scanning wiring internal circuit 106 and the scanning wiring leader line 105.

Unlike the conventional LCD device, the display device of FIG. 9 includes the pixel display area 101 having an elliptic outer contour. Therefore, the signal wiring internal circuit 104 and the scanning wiring internal circuit 106 are also arranged adjacent to the pixel display area 101. In this configuration, to send signals to each of the pixels arranged in an orthogonal matrix form, the internal circuits 104 and 106 overlap with each other in a part of the frame area. This is indicated as an overlap area 107 in FIG. 9. The more the number of the overlap areas is, the more the frame area is. That is, the area not used for the display is increased. To prevent the enlargement of the frame area, the third embodiment employs a configuration as below.

Figure 10:
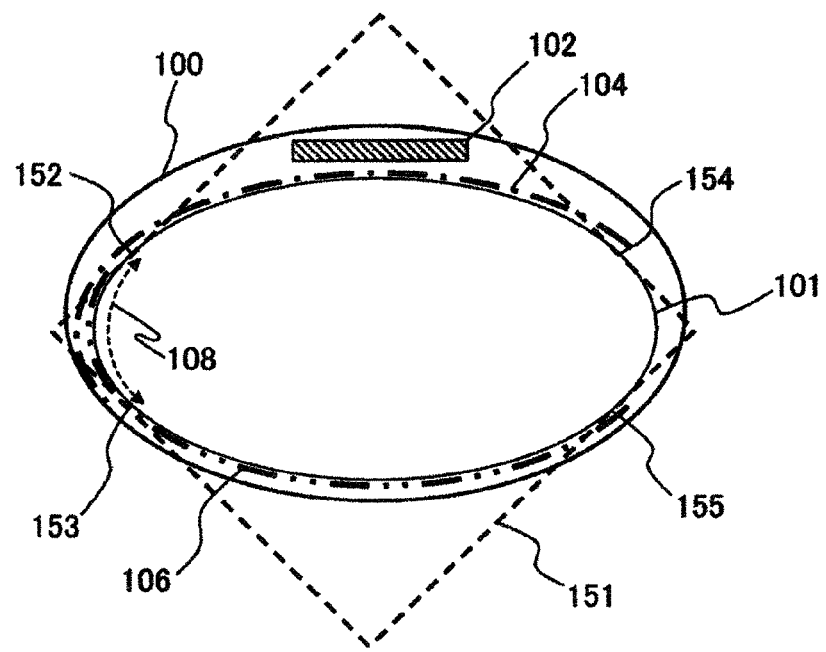
FIG. 10 is a conceptual diagram of a third embodiment of a display device.

FIG. 10 conceptually shows a configuration of a display device 100 in the third embodiment. Like the display device shown in FIG. 9, the display device 100 of the embodiment has also an elliptic outer contour, but differs from that of FIG. 9 in the locations in which the signal wiring internal circuit 104 and the scanning wiring internal circuit 106 are arranged.

In FIG. 10, the pixel display area 101 is circumscribed by a broken-line rectangle 151. In this connection, a rectangle circumscribing an arbitrary contour includes at least four contact points. The circumscribing rectangle 151 shown in FIG. 10 is disposed such that the distance along the outer contour of the image display area between arbitrary two contact points on mutually different edges of the rectangle 151 takes a minimum value. In FIG. 10, the distance 108 along the outer contour of the image display area between a first contact point 152 and a second contact point 153 takes a minimum value. The signal wiring internal circuit 104 is arranged along the pixel display area 101 from the second contact point 153 via the first contact point 152 to a third contact point 154 on one other edge of the rectangle 151.

According to an aspect of the embodiment, the scanning wiring internal circuit 106 is arranged along the pixel display area 101 from the first contact point 152 via the second contact point 153 to a fourth contact point 155 on the remaining other one edge of the rectangle 151.

By disposing the signal wiring internal circuit 104 and the scanning wiring internal circuit 106 as above, the outer edge section of the pixel display area on which the inner circuits 104 and 106 are arranged in an overlapped manner is remarkably reduced.

The circumscribing rectangle 151 shown in FIG. 10 indicates a direction of arrangement of pixels arranged in the orthogonal matrix in the pixel display area 101. By disposing the respective internal circuits at locations crated by projecting the orthogonal edges onto the pixel display area 101, the orthogonal matrix drive can be implemented. According to an aspect of the embodiment, to possibly reduce the overlapped arrangement of the internal circuits, the circumscribing rectangle 151 is arranged such that the distance along the outer contour of the image display area between the contact points on the orthogonal edges (adjacent edges) of the rectangle 151 takes a minimum value.

In the embodiment, the outer contour of the pixel display area 101 is horizontally symmetric, and hence the distance between the first and second contact points 152 and 153 is substantially equal to that between the third and fourth contact points 154 and 155. That is, even if the locations of arrangement of the internal circuits 104 and 106 are replaced with each other, there occurs no problem.

There may also be considered a configuration in which only the signal wiring internal circuit 104 is integrally arranged, and the scanning wiring circuit is not arranged as an internal circuit such that the wiring is directly drawn. Also in this situation, if the overlapped area between the signal wiring internal circuit and the wiring drawing area of the scanning wiring is large, it is required to arrange the detour wiring through a long distance, which hence increases the frame area. Therefore, also in the configuration in which only the signal wiring circuit is disposed as an internal circuit, when the signal wiring internal circuit is arranged as in the case of the signal wiring internal circuit 104 of FIG. 10 and the wiring drawing area of the scanning wiring is arranged as in the case of the scanning wiring internal circuit 106 of FIG. 10, there can be attained an advantageous effect of reduction in the frame area. This also applies when only the circuit for the scanning wiring is disposed as an internal circuit.

According to the third embodiment, by possibly reducing the overlapped arrangement between the signal wiring internal circuit and the scanning wiring internal circuit, the frame area can be further reduced. It is hence possible to an easily designable display device with a reduced frame area and a reduced wiring delay.

Fourth Embodiment

Figure 11:
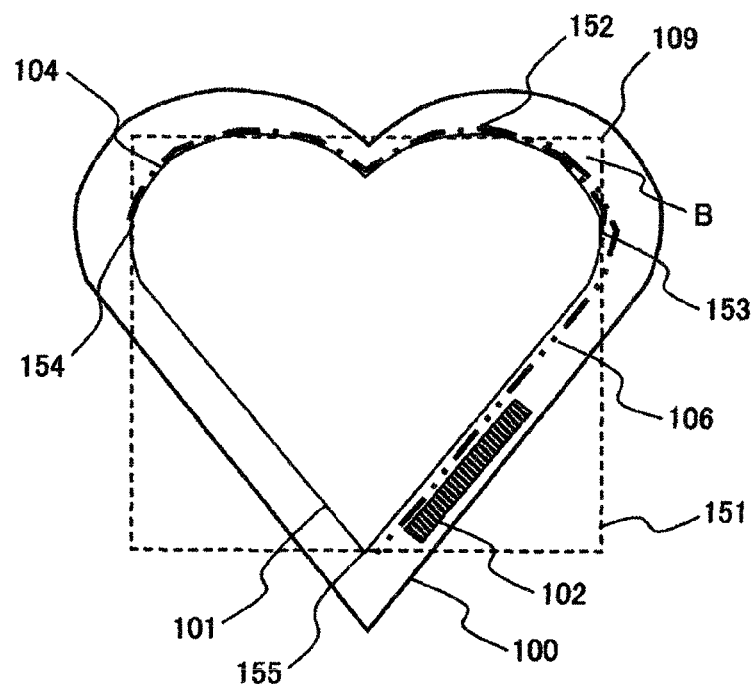
FIG. 11 is a conceptual diagram of a fourth embodiment of a display device.

FIG. 11 is a conceptual diagram showing a display device 100 in the fourth embodiment. The display device 100 differs from that shown in FIG. 10 in that the outer contour of the device 100 and that of the pixel display area 101 are in the form of a heart shape. In the embodiment, the circumscribing rectangle 151 is arranged such that in the area enclosed by the rectangle 151 and the pixel display area 101, an arbitrary area including a right-angle section or point of the rectangle 151 has a minimum area. In FIG. 11, the rectangle 151 is arranged such that an area B enclosed by a line between the first contact point 152 and the right-angle point 109, a line between the second contact point 153 and the right-angle point 109, and a line drawn along the outer contour of the image display area between the first and second contact points 152 and 153 has a minimum area.

The signal wiring internal circuit 104 is arranged along the outer contour of the pixel display area from the second contact point 153 via the first contact point 152 to the third contact point 154. The scanning wiring internal circuit 106 is similarly arranged from the first contact point 152 via the second contact point 153 to the fourth contact point 155.

By arranging the internal circuits as above, the overlapped arrangement between the associated circuits can be reduced. It is hence possible to reduce the frame area associated with the overlapped arrangement. Also in the fourth embodiment, the frame area may be reduced by use of the conventional circuits as the internal circuits. Even the wiring drawing area is employed in place of the internal circuit area, the wiring delay can be reduced.

By reducing the overlapped arrangement between the signal wiring internal circuit and the scanning wiring internal circuit as above, it is possible to further reduce the frame area. There is consequently provided an easily designable display device having a reduced frame area and a reduced wiring delay.

Fifth Embodiment

In the configurations of the third and fourth embodiments, the respective internal circuits are appropriately arranged such that the overlapped arrangement between the signal wiring internal circuit and the scanning wiring internal circuit is reduced to the maximum extent. On the other hand, according to the fifth embodiment, it is avoided the arrangement in which the signal wiring internal circuit or the scanning wiring internal circuit is disposed in an area, the arrangement making the designing difficult due to additional wiring and the like if the internal circuit is disposed in the area.

Figure 12:
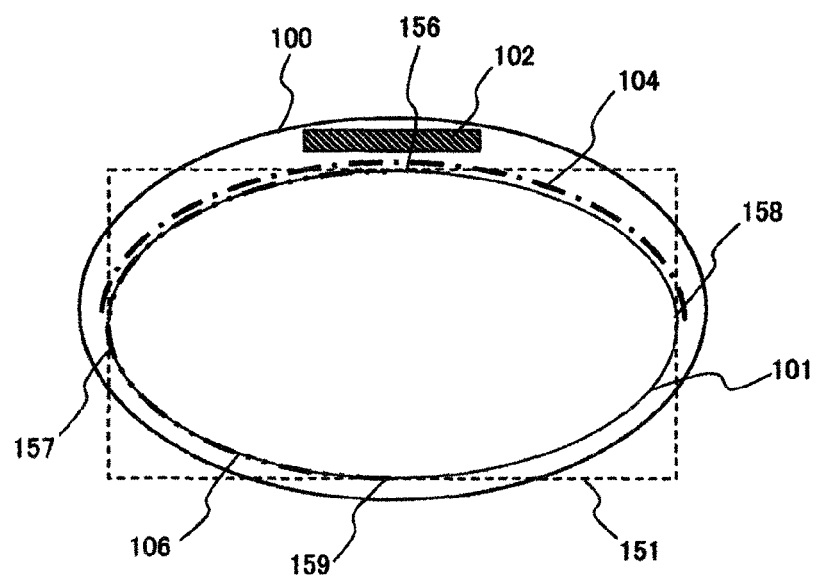
FIG. 12 is a conceptual diagram of a fifth embodiment of a display device.

FIG. 12 shows a conceptual diagram of a display device 100 in the fifth embodiment. The display device 100 has an elliptic outer contour like that of FIG. 10, but the positions of the signal wiring internal circuit 104 and the scanning wiring internal circuit 106 vary between FIGS. 10 and 11.

According to an aspect of the fifth embodiment, from the contact points between the pixel display area 101 and the mutually different edges of the circumscribing rectangle 151 of the area 101, the contact point 156 for which the outer contour of the area 101 has the largest value of the radius of curvature is selected such that the signal wiring internal circuit 104 is arranged along the outer contour of the pixel display area 101 between two contact points (the second and third contact points 157 and 158) on the edges vertical to the edge including the contact point 156.

The scanning wiring internal circuit 106 is arranged between the contact point 156 with the largest radius of curvature and the fourth contact point 159 on the edge opposing to the edge including the contact point 156.

The pixel display area 101 includes a plurality of pixels arranged in an orthogonal matrix form along the direction of the circumscribing rectangle 151. Since the area 101 has an elliptic shape, the number of pixel rows (or columns) varies in some areas. In general, in a sub-area of the area 101 having a large radius of curvature, the number of pixel rows (or columns) in the orthogonal matrix form changes less frequently and such change rarely occurs in two or more rows at the same time. On the other hand, in a sub-area of the area 101 having a small radius of curvature, the number of pixel rows (or columns) varies more frequently and the change occurs also in two or more rows at the same time.

In the case in which the signal wiring internal circuit modules are used in two stages in the signal wiring extending direction, if the change occurs in two or more rows at the same time, the input/output wiring sections of the circuit are not automatically connected to each other. It is hence required to dispose additional wiring. This increases the period of time required for the designing job and the designing is more difficult. Therefore, when the internal circuit modules configured in the unit of the pixel are used, it is desirable that the modules are arranged in an area having a larger radius of curvature.

Therefore, in the fifth embodiment, the signal wiring internal circuit 104 is arranged at a position centered on a point having a larger value of the radius of curvature on the outer contour of the pixel display area 101. This makes it possible to reduce the time required for the designing as well as to make the designing easier. Although the signal wiring internal circuit is arranged in an area having a large radius of curvature in the embodiment, it is also possible to dispose the scanning wiring internal circuit in the area of the large radius of curvature. Determination of which one of the signal wiring internal circuit and the scanning wiring internal circuit is to be arranged in the area having a large radius of curvature considerably depends on the number of modules to be used in consideration of the wiring load. For the internal circuit using a small number of modules, it is likely that the number of additional wiring areas increases in association with the reduction in the number of pixel rows (columns). Therefore, it is desirable to arrange such internal circuit in the area having a large radius of curvature.

Also in the embodiment, the internal circuit employed in the area having a large radius of curvature may be the internal circuit of the prior art. This also leads to an advantage that the number of additional wiring areas is reduced and the designing is facilitated. However, it is favorable in this case that the scanning wiring drive circuit area is not configured as an internal circuit, but is disposed as the wiring leader area.

By arranging the internal circuits at appropriate locations in consideration of the outer contour of the pixel display area, the designing time is reduced and it is possible to make the designing easier. Consequently, there can be provided an easily designable display device with a reduced frame area and a reduced wiring delay.

Sixth Embodiment

Figure 13:
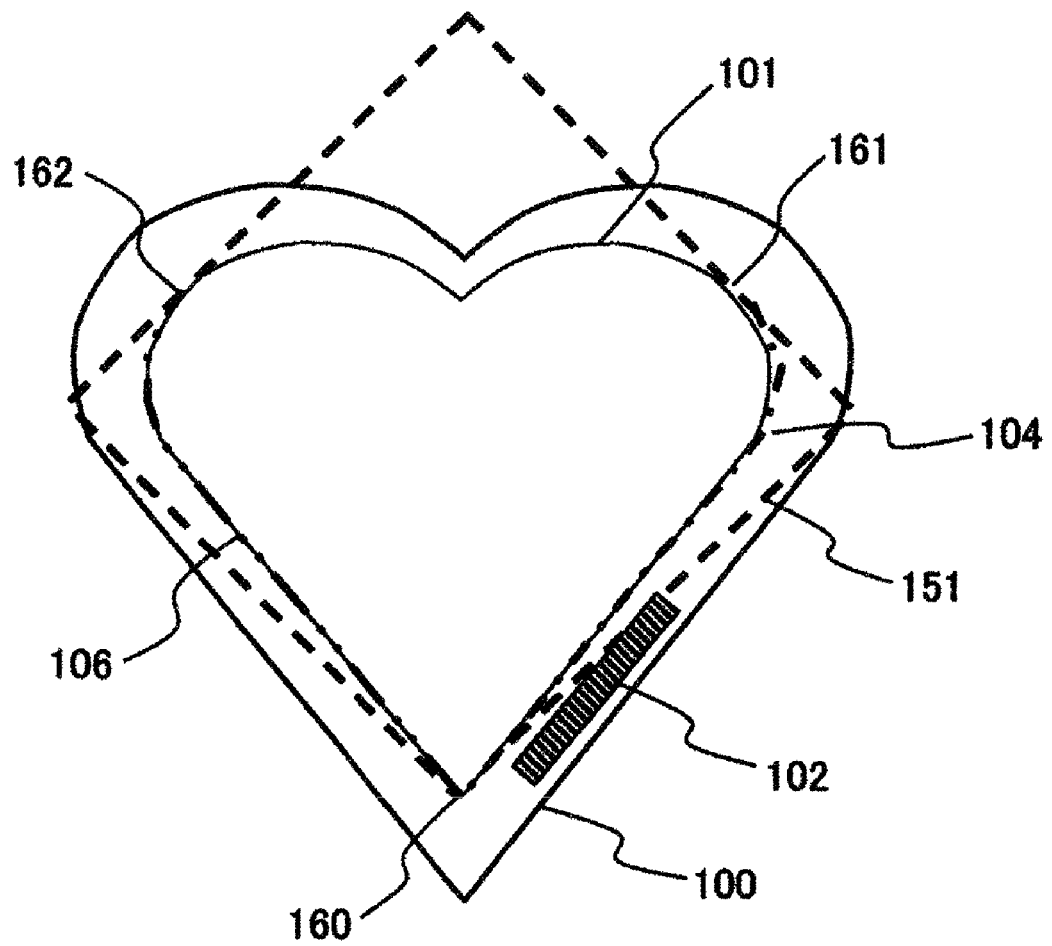
FIG. 13 is a conceptual diagram of a sixth embodiment of a display device.

FIG. 13 is a conceptual diagram of a display device 100 in the sixth embodiment. The outer contour of the display device 100 and that of the pixel display area 101 of the device 10 has a heart shape as those of the display device shown in FIG. 11. However, FIG. 13 differs from FIG. 11 in that the signal wiring internal circuit 104 and the scanning wiring internal circuit 106 are arranged in FIG. 13 in other than the positions of the associated circuits in FIG. 11.

In the sixth embodiment, the outer contour of the image display area 101 includes an acute vertex 160 having an acute angle. In FIG. 13, a circumscribing rectangle 151 of the pixel display area 101 includes the acute vertex 160.

The signal wiring internal circuit 104 and the scanning wiring internal circuit 106 are arranged between the acute vertex 160 and a contact point 161 on an edge of the circumscribing rectangle 151, the edge not including the acute vertex 160. In FIG. 13, The signal wiring internal circuit 104 is arranged between the acute vertex 160 and the first contact point 161, and the scanning wiring internal circuit 106 is arranged between the acute vertex 160 and a second contact point 162.

As a result, there exists no area in which the internal circuits 104 and 106 are arranged to overlap with each other. This hence removes the problem of the increased frame area due to the overlapped arrangement. In the above arrangement, the frame area can be reduced to the maximum extent by using the conventional internal circuits as the internal circuits. If either one of the internal circuits 104 and 106 is arranged as a wiring leader line, the detour wiring is not required. It is hence possible to reduce the frame area and the wiring delay.

As described above, also in the sixth embodiment, by arranging the internal circuits at appropriate positions in consideration of the outer contour of the pixel display area, it is possible to reduce the designing time and to make the designing easier. There can be hence provided an easily designable display device with a reduced frame area and a reduced wiring delay.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image display device, comprising:
a plurality of pixels arranged in an orthogonal matrix form;
a plurality of scanning wiring lines connected to the plural pixels;
a plurality of signal wiring lines connected to the plural pixels, the signal wiring lines being disposed to construct an orthogonal matrix form with the plural scanning wiring lines;
scanning wiring internal circuits for driving the plural scanning wiring lines; and
an image display area including a plurality of pixels, the image display area having a non-rectangular outer contour, wherein
the scanning wiring internal circuits are separated from each other in an extending direction of the scanning wiring lines in a unit of length of the pixel.

2. An image display device according to claim 1, further comprising signal wiring internal circuits for driving the plural signal wiring lines, wherein
the signal wiring internal circuits are separated from each other in an extending direction of the signal wiring lines in a unit of length of the pixel.

3. An image display device, comprising:
a plurality of pixels arranged in an orthogonal matrix form;
a plurality of scanning wiring lines connected to the plural pixels;
a plurality of signal wiring lines connected to the plural pixels, the signal wiring lines being disposed to construct an orthogonal matrix form with the plural scanning wiring lines;
a pixel display area including a plurality of pixels, the pixel display area having a non-rectangular outer contour;
scanning wiring internal circuits formed along the outer contour of the pixel display area for driving the plural scanning wiring lines; and
signal wiring internal circuits formed along the outer contour of the pixel display area for driving the plural signal wiring lines, wherein the signal wiring internal circuits and the scanning wiring internal circuits are arranged beginning at a start point, the start point being either one of two contact points, selected from contact points between the outer contour of the pixel display area and a particular rectangle circumscribing the outer contour, the contact points being on mutually different edges of the particular rectangle, the two contact points having a shortest distance therebetween along the outer contour among any other combinations of two contact points.

4. An image display device according to claim 3, wherein:
the signal wiring internal circuits and the scanning wiring internal circuits are arranged beginning respectively at the two contact points,
the signal wiring internal circuits and the scanning wiring internal circuits being overlapped with each other between the two contact points.

5. An image display device according to claim 4, wherein the signal wiring internal circuits and the scanning wiring internal circuits are arranged
using, as an end point, one of the contact points on an edge other than the edges respectively including the two contact points.

6. An image display device according to claim 4, wherein the signal wiring internal circuits and the scanning wiring internal circuits are formed along the outer contour of the pixel display area, the outer contour associated with the signal and scanning wiring internal circuits extending from a first contact point between the rectangle and the outer contour of the pixel display area via a second contact point therebetween to a third contact point therebetween, the first to third contact points being on mutually different three edges of the rectangle.

7. An image display device, comprising:
a plurality of pixels arranged in an orthogonal matrix form;
a plurality of scanning wiring lines connected to the plural pixels;
a plurality of signal wiring lines connected to the plural pixels, the signal wiring lines being disposed to construct an orthogonal matrix form with the plural scanning wiring lines;
a pixel display area including a plurality of pixels, the pixel display area having a non-rectangular outer contour; and
signal wiring internal circuits formed along the outer contour of the pixel display area for driving the plural signal wiring lines, wherein
the signal wiring internal circuits and leader sections for the scanning wiring lines are arranged beginning at a start point,
the start point being either one of two contact points selected from contact points between the outer contour of the pixel display area and a particular rectangle circumscribing the outer contour, the contact points being on mutually different edges of the particular rectangle, the two contact points having a shortest distance therebetween along the outer contour among any other combinations of two contact points.

8. An image display device according to claim 7, wherein:
the signal wiring internal circuits and the leader sections for the scanning wiring lines are arranged beginning respectively at the two contact points,
the signal wiring internal circuits and the leader sections being overlapped with each other between the two contact points.

9. An image display device according to claim 8, wherein the signal wiring internal circuits and the leader sections are arranged using, as an end point, one of the contact points on an edge other than the edges respectively including the two contact points.

10. An image display device according to claim 8, wherein the signal wiring internal circuits and the leader sections are formed along the outer contour of the pixel display area, the outer contour associated with the signal and scanning wiring internal circuits extending from a first contact point between the rectangle and the outer contour of the pixel display area via a second contact point therebetween to a third contact point therebetween, the first to third contact points being on mutually different three edges of the rectangle.

11. An image display device, comprising:
a plurality of pixels arranged in an orthogonal matrix form;
a plurality of scanning wiring lines connected to the plural pixels;
a plurality of signal wiring lines connected to the plural pixels, the signal wiring lines being disposed to construct an orthogonal matrix form with the plural scanning wiring lines;
a pixel display area including a plurality of pixels, the pixel display area having a non-rectangular outer contour;
scanning wiring internal circuits formed along the outer contour of the pixel display area for driving the plural scanning wiring lines; and
signal wiring internal circuits formed along the outer contour of the pixel display area for driving the plural signal wiring lines, wherein
the scanning wiring internal circuits and the signal wiring internal circuits are arranged beginning at a start point,
the start point being either one of two contact points, selected from contact points between the outer contour of the pixel display area and a particular rectangle circumscribing the outer contour, the contact points being on mutually different edges of the particular rectangle, the two contact points forming a smallest area with a right-angle vertex of the rectangle.

12. An image display device according to claim 11, wherein:
the scanning wiring internal circuits and the signal wiring internal circuits are arranged beginning respectively at the two contact points forming the smallest area,
the scanning wiring internal circuits and the signal wiring internal circuits being overlapped with each other between the two contact points.

13. An image display device according to claim 12, wherein the scanning wiring internal circuits and the signal wiring internal circuits are arranged using, as an end point, a contact point on an edge other than the edges respectively including the two contact points forming the smallest area.

14. An image display device according to claim 12, wherein the scanning wiring internal circuits and the signal wiring internal circuits are formed along the outer contour of the pixel display area, the outer contour associated with the signal and scanning wiring internal circuits extending from a first contact point between the rectangle and the outer contour of the pixel display area via a second contact point therebetween to a third contact point therebetween, the first to third contact points being on mutually different three edges of the rectangle.

15. An image display device, comprising:
a plurality of pixels arranged in an orthogonal matrix form;
a plurality of scanning wiring lines connected to the plural pixels;

a plurality of signal wiring lines connected to the plural pixels, the signal wiring lines being disposed to construct an orthogonal matrix form with the plural scanning wiring lines;

a pixel display area including a plurality of pixels, the pixel display area having a non-rectangular outer contour;

scanning wiring internal circuits formed along the outer contour of the pixel display area for driving the plural scanning wiring lines; and signal wiring internal circuits formed along the outer contour of the pixel display area for driving the plural signal wiring lines, wherein:

contact points between the outer contour of the pixel display area and a particular rectangle circumscribing the outer contour include a contact point associated with a largest radius of curvature of the outer contour of the pixel display area; and the scanning wiring internal circuits or the signal wiring internal circuits are arranged using as a start point and an end point, the contact point on an edge of the rectangle vertical to the edge associated with the largest radius of curvature.

16. An image display device according to claim 15, wherein;

the signal wiring internal circuits are arranged using as a start point and an end point, the contact point on an edge of the rectangle vertical to the edge associated with the largest radius of curvature; and the scanning wiring internal circuits are arranged using as a start point, the contact point associated with the largest radius of curvature.

17. An image display device according to claim 15, wherein;

the signal wiring internal circuits are arranged using as a start point and an end point, the contact point on an edge of the rectangle vertical to the edge associated with the largest radius of curvature; and leader sections for the scanning wiring lines are arranged using as a start point, the contact point associated with the largest radius of curvature.

18. An image display device, comprising:

a plurality of pixels arranged in an orthogonal matrix form;

a plurality of scanning wiring lines connected to the plural pixels;

a plurality of signal wiring lines connected to the plural pixels, the signal wiring lines being disposed to construct an orthogonal matrix form with the plural scanning wiring lines;

a pixel display area including a plurality of pixels, the pixel display area having an outer contour including a point of an acute angle;

scanning wiring internal circuits formed along the outer contour of the pixel display area for driving the plural scanning wiring lines; and signal wiring internal circuits formed along the outer contour of the pixel display area for driving the plural signal wiring lines, wherein:

a particular rectangle circumscribing the outer contour of the pixel display area, the rectangle includes a vertex which is one of contact points between the rectangle and the outer contour and which is at the point of an acute angle of the outer contour; and the scanning wiring internal circuits and the signal wiring internal circuits are arranged using as a start point, the contact point at the point of an acute angle.

19. An image display device according to claim 18, wherein the scanning wiring internal circuits are arranged using, as an end point, one of the contact points which is nearest to the contact point at the acute angle.

20. An image display device according to claim 19, wherein the signal wiring internal circuits are arranged using, as an end point, one of the contact points on one of the edges of the rectangle which is other than the edge including the end point of the scanning wiring internal circuits.

\* \* \* \* \*